Patented May 15, 1923.

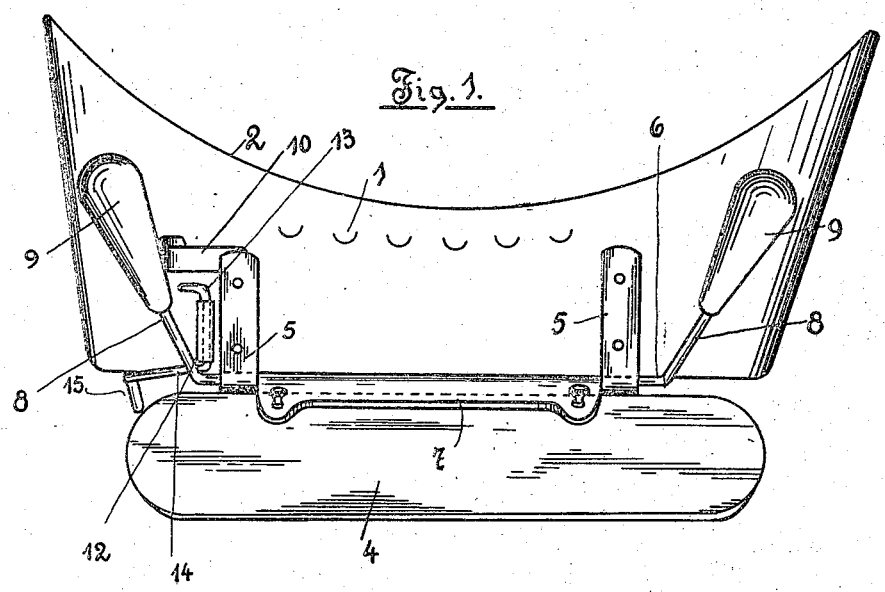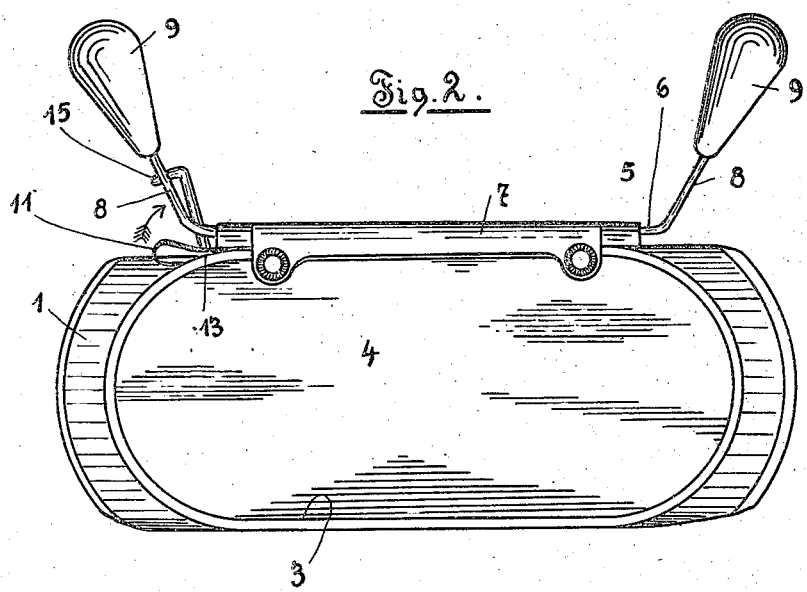

UNITED STATES PATENT OFFICE.

KARL KERN JENNY AND WILHELM BALZER-ALBER, OF BASEL, SWITZERLAND.

SELF-ACTING EYE PROTECTOR.

Application filed December 14, 1921. Serial No. 522,430.

*To all whom it may concern:*

Be it known that we, KARL KERN JENNY and WILHELM BALZER-ALBER, residing at Basel, Switzerland, have invented certain new and useful Improvements in Self-Acting Eye Protectors, of which the following is a specification.

This invention has for its object to provide a self-acting eye-protector for use in preventing injury or hurt to the eye coming from without, said protector being particularly designed for application by persons following different callings that expose the eyes to danger, in carrying out physical experiments or certain works, where it is found desirable to cover the eyes for short or long periods and where the hands of the person are otherwise occupied.

The invention is shown in the accompanying drawings, in which:—

Fig. 1 is a plan of the protector with the transparent front shutter automatically held in a horizontal or open position.

Fig. 2 is a front view of the same with the shutter in the closed position.

The protector consists in a suitably shaped screen or open box 1 of a form similar to that used by motorists, that is to say its rear edge 2 is of a configuration so that by the aid of suitable packing material a close fit is made with the hand portion of the wearer. The front of the box forms a single opening 3 which can be temporarily or continuously closed by a transparent shutter 4. The box or body is fitted on top with two hinges 5 which carry a rotary spindle 6 to which the shutter 4 is secured by a fixed fitting 7.

The cranked extensions 8 at both ends of the spindle 6 are loaded by weights 9 so determined as to require but a slight upward shake of the wearer's head in order to cause the shutter 4 to pass from the closed position (Fig. 2) into the open position (Fig. 1).

In the position as shown in Fig. 1, the shutter is and remains open so as to allow free use of the eye-sight and it does not close down even by bending the head in looking down. However, a slight forward or downward shake of the head will cause the forward swing of the balancing weights 9, thereby closing the shutter 4. To one of the hinges is fixed a flat spring 10 having an incurved loop-like end-portion 11 which is so arranged as to retain the shutter in its open position as shown in Fig. 1. The near weight 9 will slip over and behind the spring loop 11 and then hold the shutter 4 in a horizontal or at a slightly upward angular position. At any slight natural motion of the head the weight is retained by the spring 10 and thus keeps the shutter open.

To the hinge carrying the spring 10 there is fixed a supplementary hinge-leaf 12 fitted with an easily turnable retaining catch 13 which can be moved from the horizontal position shown in Fig. 1 to the vertical position shown in Fig. 2. The retaining catch has at one end the short arm 13 and at the opposite side a longer arm 14 with an offset 15. For definitely fastening the shutter in its closed position as in Fig. 2, the retaining catch 13 is turned in the direction indicated by the arrow, so that the arm 14 bears with slight friction on the extension 8, the turning movement being limited by the offset 15. This is the position shown in Fig. 2. The turning of the catch-arm 13 in opposite direction will release the weight and the shutter. This last described device should only be used when it is desired to definitely keep the shutter closed.

We claim:—

1. A self acting eye-protector, comprising in combination, a screen or box, suitably shaped to fit around the eyes, a transparent shutter hingedly connected to said screen or box and balancing means, adapted to permit said transparent shutter to be opened or closed by a slight shaking of the wearer's head and then to remain opened or closed until another shake of the head is made.

2. A self acting eye-protector, comprising in combination, a screen or box suitably shaped to fit around the eyes, a transparent shutter hingedly connected to said screen or box; balancing means, adapted to permit said transparent shutter to be opened or closed by a slight shaking of the wearer's head and then to remain opened or closed until another shake of the head is made and locking means, adapted for definitely holding said transparent shutter in opened and closed position.

3. A self acting eye-protector, comprising in combination a screen or box suitably shaped to fit around the eyes, a transparent shutter hingedly connected to said screen or box; balancing means, adapted to permit said transparent shutter to be opened or closed by a slight shaking of the wearer's head and then to remain opened or closed until another shake of the head is made, a flat spring and an inturned loop-like end portion on said spring, adapted to form a friction brake on said balancing means in order to keep the transparent shutter open and steady for ordinary sight, but yielding to a shake of the wearer's head.

4. A self acting eye-protector, comprising in combination a screen or box, suitably shaped to fit around the eyes, a transparent shutter hingedly connected to said screen or box, balancing means, adapted to permit said transparent shutter to be opened or closed by a slight shaking of the wearer's head and then to remain opened or closed, until another shake of the head is made, a hinge leaf fixed to said screen or box at a right angle to the hinge-connection of said shutter, and a rotary catch, supported by said hinge leaf and being provided with crank-arms adapted to be turned in order to definitely lock said shutter in its closed position.

In testimony whereof we affix our signatures in presence of two witnesses.

K. KERN JENNY.
WILH. BALZER-ALBER.

Witnesses:
FRIEDH. RURR,
J. DÜRST.